United States Patent [19]

Kaelin

[11] Patent Number: 4,974,957
[45] Date of Patent: Dec. 4, 1990

[54] DEVICE FOR 3-DIMENSIONAL IMAGING OF LASER AND/OR COLLIMATED LIGHT

[76] Inventor: Barney Kaelin, 401 Campdell St., Playa del Rey, Calif. 90293

[21] Appl. No.: 305,852

[22] Filed: Feb. 2, 1989

[51] Int. Cl.⁵ ............................................. G03B 21/56
[52] U.S. Cl. ........................................ 353/10; 350/123
[58] Field of Search .................... 350/117, 123, 144; 353/10, 15; 272/8 P; 362/811

[56] References Cited

U.S. PATENT DOCUMENTS 1,650,341  11/1927  Goldstein ........................... 350/123
1,944,187   1/1934  Marsat ................................. 353/10

FOREIGN PATENT DOCUMENTS 544121  10/1953  Italy ................................... 350/123
141807   4/1920  United Kingdom ............... 350/123
376557   7/1932  United Kingdom ............... 350/123

Primary Examiner—Harry N. Haroian

[57] ABSTRACT

A device for 3-dimensional imaging of laser light effects when said light is imaged on and passes through plural imaging elements resulting in a multi-planer and apparently 3-dimensional image when viewed.

6 Claims, 2 Drawing Sheets

DEVICE FOR 3-DIMENSIONAL IMAGING OF LASER AND/OR COLLIMATED LIGHT

FIELD OF INVENTION

This invention relates to the 3-dimensional display of projected patterns of laser light. The device provides a method of viewing laser light in a 3-dimensional medium.

BACKGROUND OF THE INVENTION

In the field of laser entertainment, many methods have been used to project and display the unique properties of laser light. Due to the intensity of laser light, the purity of its color, its coherence and minimal beam divergence, lasers have been used to create aesthetically pleasing displays of abstract and graphic art.

Heretofore, there have been various methods of displaying laser light for entertainment. The most common method is to project image patterns created by scanning, diffracting or diffusing laser light onto an imaging surface, for example, a screen, wall, or other diffusely reflective surface.

One may create a 3-dimensional display by projecting scanned, diffracted, or directed laser light beams into or through a particulate medium like smoke or fog suspended in the air. With this method, the light beam becomes visible wherever it illuminates the suspended particulates. This creates a 3-dimensional effect. Without such suspended particulates, the laser light beam is invisible or difficult to see in the air.

This invention is a departure from and has significant advantages over the particulate method of 3-dimensional laser display. The invention uses plural layers of partially transmissive and partially diffusely reflective material. These layers of material act as fixed, multi-planar imaging elements for laser light patterns projected onto and through them.

Previous attempts to contain and control particulates, like smoke, within an enclosed display device or area have proven futile because the particulates settle on the floor or walls of any container, making it progressively harder to view the image inside.

The only practical way to use a particulate medium is to constantly refresh the supply of particulates in an open area. This is at best messy and unhealthful in that it requires viewers of the display to breathe the often unpleasant particulate supply when the display is indoors. It is difficult to use particulate laser displays as a consumer product without filling a room with smoke or fog, or building a complex device to prevent deposition of particulate on the walls of a display box.

Outdoor displays which depend on natural atmospheric conditions are unreliable in that the suspension of water vapor or particles in the air varies widely. A display may look good one night and be barely visible the next. Indoors there is rarely enough natural suspension of water vapor or airborne particles to make 3-dimensional laser displays practical. In both indoor and outdoor environments regardless of ambient particle suspension, large amounts of laser power are necessary to create a visible 3-dimensional display. Lasers needed for such displays are very expensive, costing tens of thousands of dollars. This fact places 3-dimensional laser displays out of the range of consumer pricing and at a very high level for commercial or industrial applications.

Recently, highly collimated incandescent light sources have been used for similar entertainment purposes, i.e., scanning and directing beams for display. The same difficulties of display and viewing are present for these non-laser beams as for lasers. In fact the problems are compounded since even the most collimated of non-laser light sources still has a large beam divergence.

OBJECTS AND ADVANTAGES

Accordingly, one of the objects and advantages of my invention is that it permits 3-dimensional imaging of laser light in a controlled fashion without the need for suspension of particulate matter in the atmosphere.

Another object and advantage is to provide a pleasing means of viewing the unique properties of scanned, diffracted, and directed laser light patterns and effects with the added advantage of seeing said imagery appearing to float and move in a 3-dimensional space, with the appearance of perspective when viewed from any side.

An additional object and advantage is to provide a safe means of viewing potentially hazardous levels of laser light. My invention permits the viewer to approach and view a 3-dimensionally imaged display of laser patterns and effects without being directly exposed to hazardous levels of laser light.

Another object and advantage of my invention is that it prevents persons viewing a 3-dimensional display of potentially hazardous levels of laser light from deliberately or accidentally exposing themselves to such hazardous light. This invention confines such laser light to a transparent enclosed housing or to a well-defined area consisting of fixed and visible materials which can be easily marked with warning labels and protected from easy access.

In addition, I claim as an object and advantage of my invention the ability to display 3-dimensional image patterns of laser light without having to expose the viewer to noxious fumes from chemical or organic smoke generators. This permits such a display to be used where particulate smoke is undesirable, dangerous, or difficult to use.

A related object and advantage of this invention is that it permits the viewing of 3-dimensionally imaged light from scanned, diffracted, or directed light beams without the necessity of using artificially or naturally occurring fog or suspended water vapor to image such laser light. This further has the advantage of protecting the immediate area of said display from damage, mess, or inconvenience of condensation from fog or suspended water vapor normally used for such a display.

An additional object and advantage of this invention is that it provides a solid and fixed means for displaying 3-dimensional laser imagery. Since the means of displaying the 3-dimensional light is a series of solid and fixed imaging elements instead of a volatile particulate medium, the invention can be incorporated into a housing which can be made as large or small as is desired for an application. This housing can be made compact enough to permit it to be moved anywhere desired or necessary.

Another object and advantage of this invention is to provide a means for 3-dimensionally imaging patterns of laser light using low power and relatively inexpensive lasers. The invention provides for very efficient transfer of laser light to the diffusely reflective imaging material. Instead of being absorbed by particulate material which may not be very reflective, the laser light is incident on material which can be selected for its diffuse reflection properties. This maximizes the brightness of the laser light imaged on each of the reflective surfaces.

Because of the efficiencies possible with the invention, inexpensive lasers can be used effectively, permitting the device to be used for low price consumer products.

Another object and advantage of this invention is that the display configuration can be made very large for large-scale displays which use high-powered lasers and can also be very small for small-size, low-power displays.

| List of Reference Materials | |
|---|---|
| 10 | Light light source |
| 12 | Image generator |
| 13 | Imaging element attachment lines |
| 14a–14n | Imaging elements |
| 16 | Imaging element housing |
| 18 | Projector housing |
| 22 | Support post |
| 24 | Environmental termination element |
| 26 | Terminal image |
| A | Image field of patterns produced by image generator 12 |
| A1–An | Images created by the intersection of image field A and imaging elements 14a-14n |
| n | A variable corresponding to the total number of images or the final letter in the sequence of imaging elements. |

Figure 1:
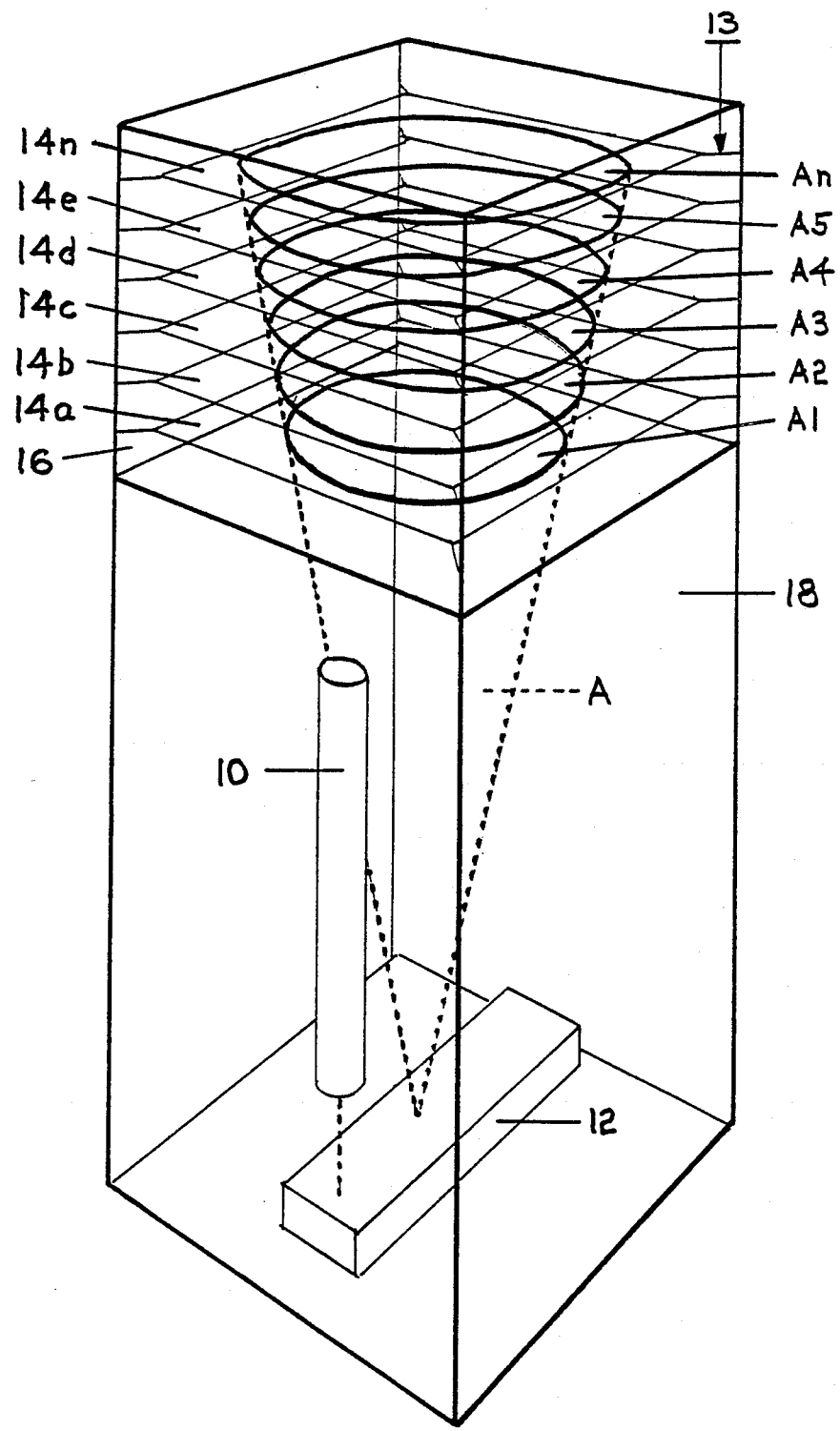
FIG. 1. shows a front perspective view of the invention with imaging elements 14a through 14n arranged perpendicular to the axis of the image field A.

FIG. 1 shows an embodiment of the invention as a device consisting of a projector housing 18 containing a laser light source 10, and an image generator 12.

The laser light source 10 is mounted in such a way that the output beam is directed to the image generator 12 which consists of any laser light effects generator such as those commonly used in laser light shows. This includes such devices as laser vector or raster scanners like galvanometers, rotating mirrors, speaker scanners; also diffraction grating rotators, light diffusors and the electronics necessary to generate and control image patterns.

The combination of the laser light source 10, the image generator 12 and the projector housing 18 is the projector.

The image generator 12 generates an image field A. This image field is the scanned, diffracted, diffused or directed laser light rays which when diffusely reflected by a surface create an image of the pattern generated by the image generator 12. The image field A is projected out of the projector by the image generator 12.

The image element housing 16 is a housing comprised of clear and transparent materials such as plastic or glass. The shape of the image element housing 16 in FIG. 1 is a cube, but it can be made in any desired shape.

The image element housing 16 contains n pieces of an imaging material where n corresponds to the final letter in the sequence of letters: 14a, 14b, 14c etc. used to identify the number of imaging elements. Thus there can be as many imaging elements as desired, that is, n imaging elements.

In FIG. 1 the imaging element material is fashioned into square pieces to fit the cubical shape of the image element housing, however these pieces can be fashioned into any desired shape.

The imaging elements 14a–14n are comprised of a material that is capable of imaging part of the light incident on it through diffuse reflection and also permitting the remaining, unimaged part of the incident light to pass through unobstructed and with as little diffraction or diffusion as possible. Thus the imaging element material can be described as being partially diffusely reflective and partially transmissive of light.

The imaging elements 14a–14n can be of many materials for example, textiles such as tulle or netting, wire or plastic mesh and glass or plastic materials like acrylic where the reflectance and transmittance coefficients are suitable for imaging and transmitting the light patterns generated by the invention's image generator 12.

In the embodiment of the invention shown in FIG. 1 the imaging elements 14a–14n are arranged perpendicular to the axis of the imaging field A such that the imaging elements 14a–14n present their full surfaces to the image field A. However, the imaging elements 14a–14n and the imaging element housing 16 can be oriented to any angle with respect to the image field A. This results in different image effects A1–An with each orientation.

In FIG. 1 the imaging elements 14a–14n are each attached to the imaging element housing 16 by image element attachment lines 13. These attachment lines can be a material such as thread, wire, or string. They are attached at one end to the imaging element 14a–14n and the other end attaches to the image element housing 14 by a means such as a fastener, glue, or clamping.

FIG. 1 shows images A1, A2, A3, A4, A5 and An. These reference numbers correspond to images created by the intersection of image field A and the diffusely reflective portion of the imaging elements 14a–14n where n corresponds to the final letter or highest number in the sequence of imaging elements 14a–14n or images A1–An.

FIG. 1 shows image field A passing from the image generator 12 out of the projector, into the image element housing 16 and onto and through each of the imaging elements 14a–14n and out of the image element housing 16.

Figure 2:
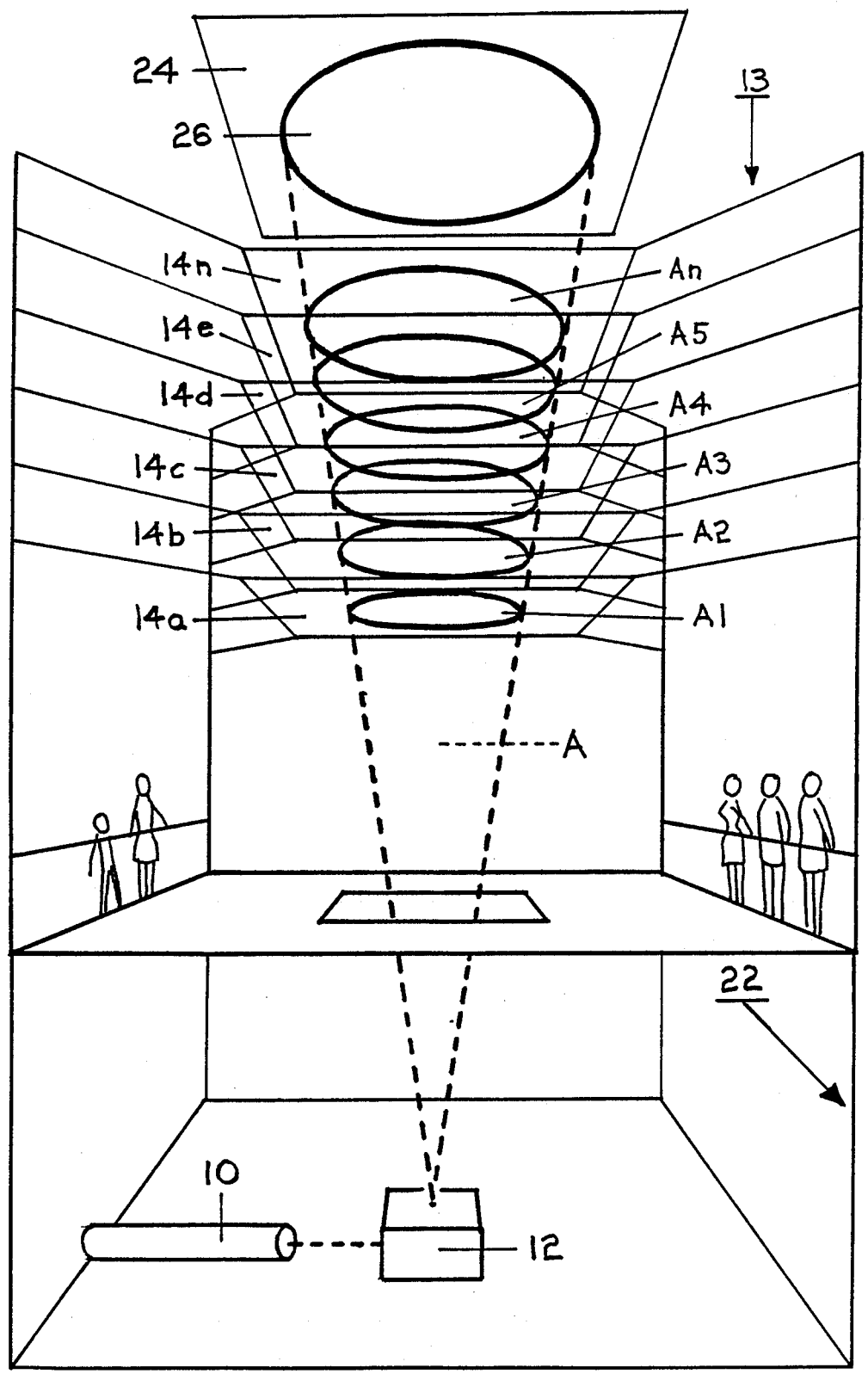
FIG. 2 shows a front perspective view of an embodiment of the invention without an imaging element housing.

The embodiment of the invention shown in FIG. 2 is similar to that shown in FIG. 1. However the embodiment of the invention shown in FIG. 2 does not include an imaging element housing 16. In FIG. 2 the imaging elements are suspended and held fixed in relation to the image generator 12 by image element attachment lines 13 which are in turn attached to support posts 22.

The invention, the embodiment of which is shown in FIG. 2, makes it possible to achieve the same 3-dimensional imaging effect achieved by the invention as shown in FIG. 1, but with the difference that the device doesn't require an imaging element housing 16 and can be made very large.

PREFERRED EMBODIMENT OF THE INVENTION

With reference to the drawings FIGS. 1 and 2; they each show a view of a particular configuration of the imaging elements 14a–14n with respect to the image generator 12.

The purpose of this device is to create a sense of 3-dimensional depth and perspective from a projection of laser light. When a laser light beam of any visible wave length is scanned, diffracted, or directed by an appropriate means such as a laser light show effects generator 12, it produces a complex wave front which is projected out of the effects device into a medium such as the air. Normally this wave front or "image field" shown as A in FIGS. 1 and 2 propagates through the air invisibly. The only way the human eye can detect the form or existence of image field A is if the field encounters and is imaged by some form of diffusing, refracting or reflective matter such as a projection screen, atmospheric particulates, or other imaging material.

The invention utilizes plural layers of an imaging material such as textiles, glass, plastic or wire mesh capable of both diffuse reflection and transmittance of light. This material is referred to as imaging elements 14a–14n.

These imaging elements are planar surfaces held adjacent to each other and fixed in relation to the projector housing. This arrangement provides a method of making the image field visible and apparently 3-dimensional by manifesting the projected laser light patterns from the projector image generator.

The imaging elements 14a–14n are comprised of plural adjacent layers of a material capable of diffusely reflecting part of image field A and transmitting the remainder. The imaging elements can be composed of any materials exhibiting these charcteristics including: textiles, transparent plastics, wire mesh, or glass. The imaging elements can be held in a housing and arranged in such a way that each is hung or held adjacent to all other layers of material and fixed in relation to the image generator 12.

The imaging elements 14a–14n can be arranged in many different ways with respect to each other and the image generator 12. The embodiment of the invention shown in FIG. 1 has the imaging elements 14a–14n arranged parallel to each other and perpendicular to the axis of the image field A projected by the image generator 12.

When the imaging elements 14a–14n and the imaging element housing 16 are oriented as shown in FIG. 1 with respect to the image generator 12 and the image field A, then image field A falls incident sequentially on each of the imaging elements 14a–14n. Images A1–An are created and appear sequentially on each of the corresponding imaging elements 14a–14n. Thus images A1–An are created in the following manner:

1. The light source 10 emits a beam of laser light which is directed to the image generator 12.

2. The image generator 12 is any laser light effects generator such as those commonly used in laser light shows. The image generator 12 acts upon the incident laser light beam creating a variety of light images and effects such as scanned, diffracted or directed laser light patterns of effects. The light rays from these patterns and effects comprise image field A which is emitted from image generator 12 and projected out of projector housing 18.

3. Image field A falls incident on the first imaging element in its path which is imaging element 14a where a portion of the image field A is imaged by diffuse reflection at every point of intersection with the imaging element material. The combination of many such intersections between the image field A and imaging element 14a results in the image A1 becoming visible and appearing on the surface of the first imaging element 14a due to the eye's perceiving the many points of intersection and interpreting them as image A1.

4. The portion of the image field that is not imaged on the first imaging element passes through the transparent portion of imaging element 14a and falls incident onto the second imaging element 14b where it is imaged in the same manner as described above forming image A2 on imaging element 14b.

5. The portion of image field A that is not imaged on either the first imaging element, 14a, or the second imaging element 14b, passes through 14b and falls incident on the third imaging element 14c where it becomes visible as image A3.

6. The same process repeats for each of the remaining imaging elements until image An is formed on imaging element 14n (where n is a variable for the total number of imaging elements).

7. The portion of the image field A that is not imaged by 14n as image An passes through image element housing 16 if the image element housing terminal face 20 is transparent.

When images A1 through An are viewed by a person in a low light environment, the images A1 through An appear as a single, multiplaner image. Due to the multiplanar nature of the images A1 through An, they appear 3-dimensional to the viewer. Since each of the images A1 through An is an image of the same image field A, any change in the image field A such as a change in the size or shape of the image pattern will be instantly and simultaneously displayed as a change in images A1 through An.

Further enhancing the appearance of images A1 through An as a single 3-dimensional image is the appearance of perspective. This apparent 3-dimensional perspective is due to the way the size of the image field A increases as it propagates through the air. As the size of image field A increases, the size of images A1 through An also increases. Scanned or diffracted laser light propagates with an angle of divergence and this angle of divergence is fairly large with a scanned or diffracted laser light beam. The result of this divergence is that the images on imaging elements 14a through 14n increase in size with their distance from the image generator 12. Thus the image A2 on imaging element 14b is bigger than the image A1 on imaging element 14a. Similarly, the image A4 on imaging element 14d is larger than image A2 on imaging element 14b.

The image on each of the imaging elements 14a through 14n is the same. The only difference in the appearance of these images is their size relative to each other. The images appear to originate from a point and expand as they get further from laser the light source 10. Therefore to the observer the combined images A1–An appear to form a 3D cone of light that is being viewed on several adjacent planes (imaging elements 14a through 14n) imaged by the propagation of image field A.

These imaging elements are hung or suspended by very thin imaging element attachment lines 13. These attachment lines can be a material such as thread, wire or string. The imaging elements 14a–14n are arranged in such a way that they are adjacent to each other. The imaging elements 14a–14n can be suspended with or without being enclosed by a housing 16.

The preferred embodiment of the invention is shown in FIG. 1 with the imaging elements 14a–14n enclosed in a transparent image element housing 16 comprised of clear acrylic, glass or other transparent materials. This housing is fixed on or adjacent to a projector housing 18 containing the laser light source 10 and image generator 12.

An alternative embodiment of the invention would have the imaging elements 14a-14n suspended by imaging element attachment lines 13 which are attached to the support posts 22 and not enclosed by a housing, but fixed in relation to the image generator 12 as shown in FIG. 2. In this configuration the surface area of the imaging elements 14a-14n could be as large as desired and placed far enough from the projector so that the projected image image field A can expand to form large images on each imaging element.

In the embodiment of the invention shown in FIG. 2, after the image field A is imaged on and passes through imaging element 14n it continues on out of the device and is imaged on any surface it encounters. This surface is the environmental termination element 24 and the image that terminates on this surface is the terminal image 26.

Thus the reader will see that this invention is a device for viewing projected patterns of laser light on multiple planes. This device permits the viewer to see the image of the image field A manifested by multiple adjacent layers of an imaging material such as textile, plastic or wire mesh or any other material that acts as a partially transmitting and partially reflecting medium for laser light.

The net result to the viewer is the impression of viewing a 3-dimensional display of light. The more layers of the imaging material used, the more solid the 3-dimensional and perspective effect.

While the above description contains many specificities, the reader should not construe these as limitations in the scope of the invention, but merely as exemplifications of preferred embodiments thereof. Those skilled in the art will envision many other possible variations that are within its scope. For example skilled artisans will be readily able to configure the device with a number of different arrangements of the imaging elements 14a-14n with respect to the image generator. They can also use a variety of materials and methods of installing these materials in a housing or of holding them relative to the image generator 12. The image generator itself can be made of any number of combinations of electro-optical devices. Accordingly the reader is requested to determine the scope of the invention by the appended claims and their legal equivalents, and not by the examples which have been given.

While a preferred embodiment of the present invention has been described, it is apparent that various changes and modifications in the apparatus may be made without departing from the spirit and scope of the invention as defined by the following claims.

I claim:

1. A device for 3-dimensional imaging of laser light comprising:
   (a) laser light source means and image generator means for generating and projecting laser light patterns onto and through a plurality of imaging elements,
   (b) said imaging elements comprising a thin partially transparent material,
   (c) each of said imaging elements supported by a plurality of imaging element attachment lines comprising thin wires or thread-like material with each of said attachment lines connected at one end to a support means and at the other end to a point on the perimeter of said imaging element,
   (d) said imaging elements held in layers in relation to said laser light source means and image generator means, permitting said laser light patterns to be imaged on and pass through each imaging element resulting in a plurality of images which when viewed from any of a plurality of sides or angles appear three dimensional.

2. A display device for 3-dimensional imaging of laser light comprising:
   (a) a laser light source and image generator for generating and projecting laser light patterns onto and through a plurality of imaging elements,
   (b) said imaging elements comprising a thin partially transparent material
   (c) a transparent image element housing chamber within which said imaging elements are each suspended by a plurality of attachment lines comprising thin wires or thread-like material with each of said attachment lines affixed at one end to a point on the perimeter of one of said imaging elements and the other end affixed to a point on the inner surface of said transparent chamber,
   (d) each of said imaging elements held in relation to said laser light source and image generator permitting said laser light patterns to be imaged on and pass through the imaging elements resulting in a series of images which when viewed from any of a plurality of sides or angles appear three dimensional.

3. The display device of claim 2 wherein the laser light source and image generator are contained in a housing attached to said transparent chamber.

4. The transparent chamber of claim 2 wherein said chamber is substantially cubical in shape.

5. The transparent chamber of claim 2 where said chamber comprises a substantially clear acrylic material.

6. The transparent chamber of claim 2 wherein said chamber comprises walls that are smooth and unbroken so as to present a substantially unobstructed view to a person viewing the images within as well as offering a minimum of diffraction and reflection to any incident laser light passing through said chamber.

* * * * *